United States Patent [19]

Bingler

[11] Patent Number: 4,897,023
[45] Date of Patent: Jan. 30, 1990

[54] LIQUID PUMP ASSEMBLY

[75] Inventor: Douglas J. Bingler, Furlong, Pa.

[73] Assignee: Milton Roy Company, St. Petersburg, Fla.

[21] Appl. No.: 277,019

[22] Filed: Nov. 28, 1988

[51] Int. Cl.[4] .............................................. F04D 29/40
[52] U.S. Cl. ............................... 417/423.15; 417/360; 417/423.14; 415/206; 310/89
[58] Field of Search ................. 417/423.1, 360, 423.15, 417/423.14, 234, 424.1, 424.2, 423.7; 415/206; 310/89

[56] References Cited

U.S. PATENT DOCUMENTS 2,766,695 10/1956 Gailloud ............................... 417/360
4,512,724 4/1985 Horvath ........................... 417/423.14

FOREIGN PATENT DOCUMENTS 0075382 8/1954 Netherlands ..................... 417/424.1

OTHER PUBLICATIONS

Cole-Parmer, 1987-1988, Catalogue, p. 582, Model 7000-00.

Primary Examiner—Carlton R. Croyle
Assistant Examiner—D. Scheuermann
Attorney, Agent, or Firm—Woodcock, Washburn, Kurtz, Mackiewicz & Norris

[57] ABSTRACT

An assembly for a liquid pump having inlet and outlet ports at its front side and an electric motor mounted on its operating shaft at its back side includes a one piece housing, preferably molded of a plastic. The housing includes a substantially flat top wall, a U-shaped bottom wall having the ends of its arms integral with the sides of the top wall, and a back wall integral with and extending across one end of the top wall and bottom wall with the other end of the housing being open. A mounting plate is secured to the pump between the pump and the motor. The pump and motor assembly is mounted in the open end of the housing with the motor being within the housing and the mounting plate being seated against the open end of the housing. Bolts extend through openings in lugs projecting from the arms of the bottom plate and are threaded into holes in lugs on the sides of the mounting plate to secure the mounting plate to the housing. Alignment pins project from the housing fits into alignment notches in the sides of the mounting plate to align the holes in the lugs on the housing and mounting plate. Wires from the motor extend through a notch in the mounting plate and cooperate with the edges of the notch to prevent longitudinal movement of the wires and thus provide a strain relief.

11 Claims, 2 Drawing Sheets 4,897,023

LIQUID PUMP ASSEMBLY

FIELD OF THE INVENTION

The present invention relates to a liquid pump assembly, and, more particularly, to an improved housing for a pump and electric motor assembly.

BACKGROUND OF THE INVENTION

Many appliances, such as dish washers, clothes washers, etc., use a water pump which is driven by an electric motor. Most of these pump and electric motor assemblies are mounted in a single housing for ease of mounting in the appliance or the like. One type of housing which has been used for such an assembly included a flat metal top, a separate generally U-shaped metal bottom portion having the ends of its arms secured to the top, and a separate metal end plate secured across one end of the bottom portion and the top portion assembly. The end plate generally has a screen to allow air to enter the housing for cooling the motor. The pump and motor assembly is mounted and secured in the housing from its front open end. A problem with this type of assembly is that the housing is made of a number of different parts which must be assembled prior to inserting the pump and motor assembly therein. This is a time consuming operation which adds to the overall cost of the assembly. Therefore, it would be desirable to have a housing in which the pump and motor assembly can be easily and quickly assembled to lower the cost of the assembly.

SUMMARY OF THE INVENTION

An assembly of a pump and electric motor in which the pump has inlet and outlet ports at one side and a drive shaft extending from an opposite side to the motor is attached includes a one piece housing, preferably of a plastic. The housing has a substantially flat top, a substantially U-shaped bottom with its arms integral with and extending from opposite sides of the top, and a back wall extending across and integral with one end of the top and bottom with the other end of the housing being open. The pump and motor assembly is within the housing with the motor being adjacent the back wall and the inlet and outlet ports projecting from the open end of the housing. Means is provided for securing the pump and motor assembly in the housing. The one piece housing provides for greater ease of assembling the pump and motor assembly in the housing.

DETAILED DESCRIPTION OF PREFERRED EMBODIMENT

Figure 1:
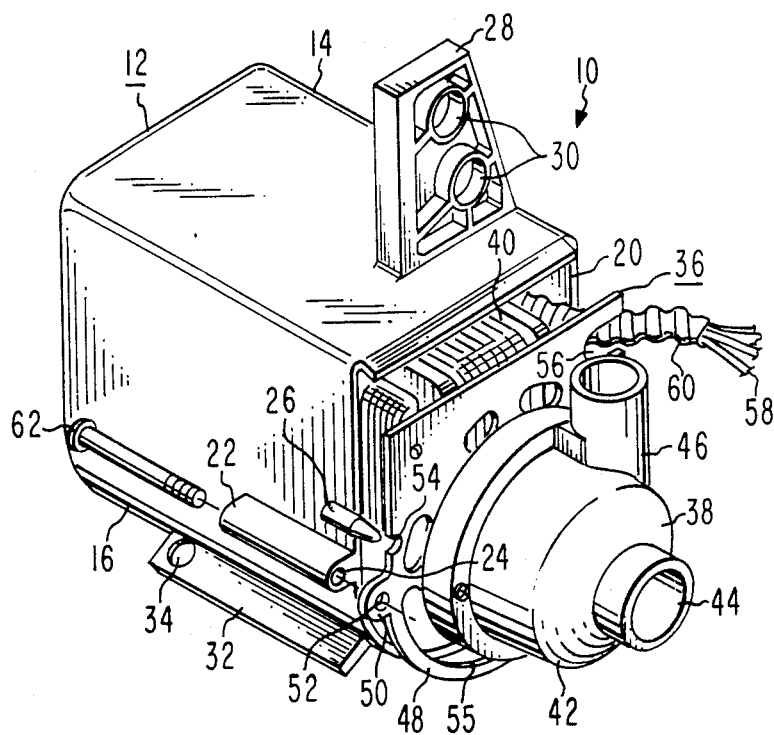
FIG. 1 is a partially exploded perspective view of the pump assembly of the present invention.
Figure 2:
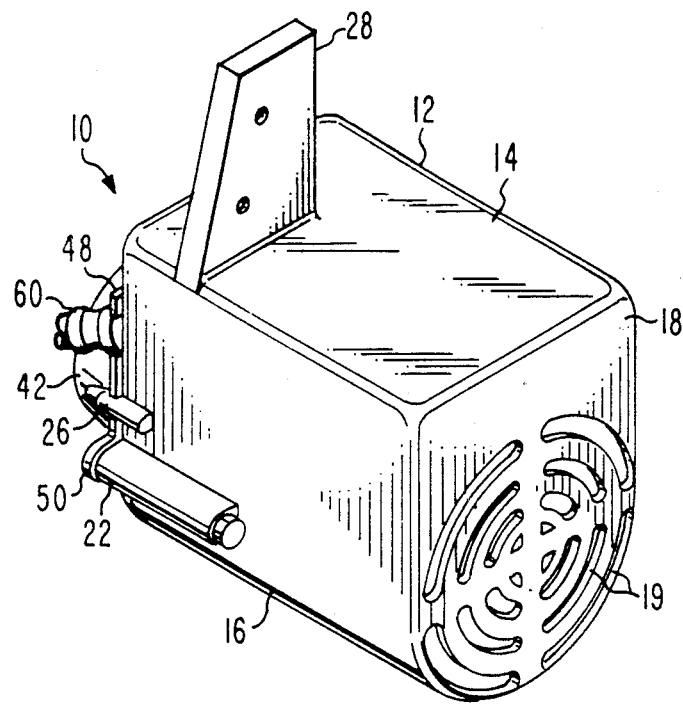
FIG. 2 is a perspective view of the pump assembly showing the back of the assembly.
Figure 3:
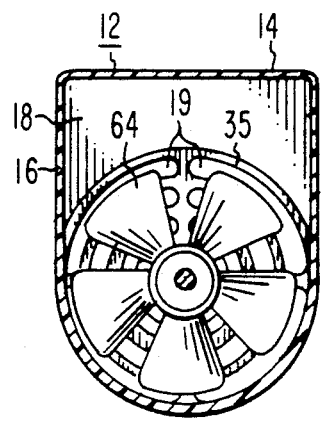
FIG. 3 is a cross-sectional view of the pump assembly showing a portion of the interior of the housing.

Referring to FIGS. 1 and 2, the pump assembly of the present invention is generally designated as 10. Pump assembly 10 includes a one piece housing 12, preferably molded of a plastic. The housing 12 includes a substantially flat top wall 14, a U-shaped bottom wall 16 having the ends of its arms integral with and extending from the sides of the top wall 14, and a back wall 18 integral with and extending across on end of the top and bottom walls 14 and 16. The back wall 18 closes one end of the housing 12 leaving the other end 20 open. The back wall 18 has a series of ventilating openings 19 therethrough. A substantially cylindrical lug 22 is integral with and extends longitudinally along the outer surface of each arm of the bottom wall from the open end 20 of the housing. Each lug 2 has a hole 24 extending longitudinally therethrough. An alignment pin 26 is integral with each arm of the bottom wall 16 above each of the lugs 22. The alignment pins 26 project beyond the open end 20 of the housing 12. A mounting arm 28 is integral with and projects upwardly from the top wall 14. The mounting arm 28 has a pair of holes 30 therethrough by which it can be secured to a mounting bracket. A plate 32 is integral with and projects from the bottom wall 16 at the rounded portion thereof. The plate 32 extends longitudinally along the bottom wall 16 and has a hole 34 therethrough. As shown in FIG. 3, a semi-cylindrical shroud 35 is integral with and projects from the inner surface of the back wall 18. The shroud 35 forms with the rounded bottom portion of the bottom wall 16 a cylindrical chamber.

The housing 12 contains and supports an assembly 36 of a liquid pump 38 and an electric motor 40. The pump 38 is contained in a plastic housing 42 having inlet and outlet ports 44 and 46 adjacent the front end thereof, and a shaft, not shown, projecting from the back end thereof. The electric motor 40 is at the back end of the pump 38 and is connected to the pump shaft so as to operate the pump. A metal mounting plate 48 is mounted on the back end of the pump housing 42 between the pump 38 and the electric motor 40. The mounting plate 48 is of a shape corresponding the cross-sectional shape of the housing 12 so that it can fit against the open end 20 of the housing 12. A pair of mounting lugs 50 having holes 52 therethrough project from the sides of the mounting plate 48. The lugs 50 are positioned so that they are aligned with the lugs 22 on the housing 12 when the mounting plate 48 is seated against the open end 20 of the housing 12. The mounting plate 48 has a pair of alignment notches 54 in its sides above the mounting lugs 50. The notches 54 are positioned to receive the alignment pins 26 when the plate 48 is seated against the open end 20 of the housing 12. The mounting plate 48 has a large strain relief notch 56 in one side thereof adjacent it top edge. The wires 58 which are connected to the electric motor 40 to conduct current thereto, are encased in a metal casing 60 having a threaded exterior. The notch 56 is of a size to receive the casing 60 with the edges of the notch 5 fitting within the threads of the casing. Thus, when the casing 60 is within the notch 56 it is prevented from moving longitudinally so as to provide a strain relief for the wires 58. The mounting plate 48 has vent openings 55 therethrough to allow the flow of air through the housing 12.

The pump and motor assembly 36 is mounted in the housing 14 by inserting the motor 40 into the open end 20 of the housing 14 until the mounting plate 48 is seated against the open end 20 of the housing 14. As the mounting plate 48 is moved close to the housing 14, the alignment pins 26 fit into the alignment notch 54 in the sides of the mounting plate 48. This aligns the mounting plate 48 with respect to the open end 20 of the housing 14 and aligns the lugs 5 with regard to the ends of the mounting lugs 22 on the housing 14 so that the holes 24 in the mounting lugs 22 are aligned with the holes 52 in the lugs 50. In addition, the alignment pins 26 hold the mounting plate 48 onto the end of the housing 1 while bolts 62 are inserted through the holes 24 in the lugs 22 and threaded into the holes 52 in the lugs 50 to secure the mounting plate and assembly 36 in the housing 14. When the pump and motor assembly 36 is inserted into the housing 14, a fan 64 mounted on the back end of the motor 40 extends into and is supported in the chamber formed by the shroud 35 and the rounded portion of the bottom wall 16. The fan 64 serves to draw air into the housing 14 through the ventilating openings 19 in the back wall 18 to cool the motor 40. Thus, there is provided by the present invention a one piece housing 12 into which the pump and motor assembly 36 can be easily and quickly inserted and mounted with the motor 40 being in the housing 14 and the pump 38 being adjacent the open end 20 of the housing 14. When the assembly 36 is inserted in the housing 14 it is held in proper position by the alignment pins 26 fitting in the notches 54 in the mounting plate 48 so that the assembler can easily secure the assembly 36 to the housing 14 by means of the bolts 62. In addition, the wires 58 are secured against longitudinal movement by the metal casing 60 fitting in the notch 56 in the mounting plate 48 so as to prevent strain on the connection between the wires 58 and the terminals of the motor 40. The hole 34 in the plate 32 is to allow a liquid exhaust tube to pass therethrough and hole the tube in position adjacent the assembly 10. The ease of assembling of the pump and motor assembly 36 in the housing 14 permitted by the present invention allows for a reduction in the cost of the assembly 10.

I claim:

1. An assembly of a pump and an electric motor in which the pump has inlet and outlet ports at one side and an operating shaft extending from an opposite side to which the motor is attached, the assembly comprising:
   a one piece housing having a substantially flat top wall, a substantially U-shaped bottom wall with the arms of the bottom wall integral with and extending from opposite sides of the top wall, and a back wall extending across one end of the bottom and top walls with the other end of the housing being open;
   the pump and motor assembly fitting into the housing with the motor being adjacent the back wall and the inlet and outlet ports of the pump projecting from the open end of the housing;
   a mounting plate mounted on the pump between the pump and the motor; and
   means securing the mounting plate against the open end of the housing.

2. An assembly in accordance with claim 1 in which the housing has an elongated lug integral with and extending along the outer surface of each arm of the bottom wall from the open end of the housing, each of the lugs has an opening extending longitudinally therethrough, the mounting plate has a lug projecting from each side thereof with a hole through the lug, and a separate bolt extends through the opening in each housing lug and is threaded into the hole in a mating mounting plate lug to secure the mounting plate to the housing.

3. An assembly in accordance with claim 2 in which the housing has an alignment pin integral with the outer surface of each arm of the bottom wall and projecting beyond the open end of the housing, and the mounting plate has notches in its sides which receive the alignment pins to align the holes in the lugs of the mounting plate and the housing.

4. An assembly in accordance with claim 3 in which the mounting plate is shaped to correspond to the transverse cross-sectional shape of the housing so that the mounting plate fits against the open end of the housing.

5. An assembly in accordance with claim 4 in which the alignment pins are positioned above the lugs on the housing and the alignment notches ar positioned above the lugs on the mounting plate.

6. An assembly in accordance with claim 3 including a notch in one side of the mounting plate adjacent its top edge, wires are connected to the motor and extend from the housing through said notch.

7. An assembly in accordance with claim 6 which the wires have a metal casing there around with the casing having a groove in its outer surface, the wires and casing extend through the notch in the mounting plate with the edge of the notch fitting in the groove in the casing to prevent longitudinal movement of the wires with respect to the housing.

8. An assembly in accordance with claim 3 in which a semi-cylindrical shroud is integral with and projects from the inner surface of the back wall of the housing and forms with the rounded portion of the bottom wall a cylindrical chamber, and a fan is mounted on the back end of the motor and fits within the cylindrical chamber.

9. An assembly in accordance with claim 8 in which the back wall has ventilating openings therethrough to allow air to be drawn into the housing by the fan to cool the motor.

10. An assembly in accordance with claim 9 in which the mounting plate has vent openings therethrough to allow the flow of air through the housing.

11. An assembly in accordance with claim 3 including a plate integral with and projecting from the outer surface of the bottom wall adjacent the round portion thereof, and a hole through the plate.

* * * * *